US00RE39422E

(19) United States
(12) Reissued Patent
Clemons

(10) Patent Number: US RE39,422 E
(45) Date of Reissued Patent: Dec. 12, 2006

(54) SELF-PROPELLED BRUSHLESS SURFACE CLEANER WITH RECLAMATION

(75) Inventor: William E. Clemons, Chesapeake, VA (US)

(73) Assignee: Clean Up America Inc., Chesapeake, VA (US)

(21) Appl. No.: 10/839,121

(22) Filed: May 5, 2004

Related U.S. Patent Documents

Reissue of:
(64) Patent No.: 6,381,801
Issued: May 7, 2002
Appl. No.: 09/569,124
Filed: May 10, 2000

(51) Int. Cl.
*B08B 5/04* (2006.01)

(52) U.S. Cl. ..... 15/320; 15/340.1; 15/354; 15/421

(58) Field of Classification Search ..... 15/320, 15/321, 322, 340.1, 340.2, 345, 354, 420, 15/421
See application file for complete search history.

(56) References Cited

U.S. PATENT DOCUMENTS

| | | | | | |
|---|---|---|---|---|---|
| 3,238,557 | A | * | 3/1966 | Foster | 15/345 |
| 3,931,662 | A | * | 1/1976 | Nayfa et al. | 15/320 |
| 3,959,010 | A | * | 5/1976 | Thompson et al. | 15/320 |
| 4,167,799 | A | * | 9/1979 | Webb | 15/320 |
| 4,191,590 | A | * | 3/1980 | Sundheim | 15/345 |
| 4,580,314 | A | * | 4/1986 | Anleitner | 15/420 |
| 4,845,801 | A | * | 7/1989 | Milly et al. | 15/321 |
| 5,287,589 | A | * | 2/1994 | Hughes | 15/321 |
| 5,331,713 | A | * | 7/1994 | Tipton | 15/320 |
| 5,469,597 | A | * | 11/1995 | Page | 15/321 |
| 5,794,304 | A | * | 8/1998 | Ritter | 15/346 |
| 5,970,574 | A | * | 10/1999 | Thrash, Jr. | 15/321 |
| 5,979,012 | A | * | 11/1999 | Fritz | 15/321 |
| 5,991,968 | A | * | 11/1999 | Moll et al. | 15/322 |
| 6,216,312 | B1 | * | 4/2001 | Rowan | 15/321 |

FOREIGN PATENT DOCUMENTS

| | | | | |
|---|---|---|---|---|
| GB | 744466 | * | 2/1956 | 15/345 |
| SU | 562265 | * | 6/1977 | 15/421 |
| WO | WO86/01240 | * | 2/1986 | 15/421 |

* cited by examiner

*Primary Examiner*—Theresa T. Snider
(74) *Attorney, Agent, or Firm*—Ladas & Parry LLP

(57) ABSTRACT

A self-propelled brushless surface cleaner with reclamation is provided as a self-contained vehicle. A cleaning head mounted to the vehicle extends forward therefrom. The cleaning head has a deck and a skirt extending from the deck such that when the skirt is placed in contact with the surface to be cleaned, a cleaning volume is defined. The cleaning head has at least one vent port formed in a forward portion thereof and at least one vacuum port formed in a rear portion thereof. Nozzles are mounted in the cleaning volume for movement therein when liquid under pressure is supplied thereto and sprayed therefrom. A liquid supply system supplies the liquid under pressure to the nozzles so that the surface to be cleaned is effectively scrubbed by the liquid to produce a mixture of the liquid and contaminants loosened from the surface to be cleaned. A vacuum recycling system coupled to the vacuum port(s) draws high-pressure air through the vent port(s) and over the surface being sprayed with the liquid under pressure. The mixture of liquid and contaminants is suctioned through the rear vacuum port(s) and filtered to separate the liquid from the contaminants. The liquid so-separated is returned to the liquid supply system for reuse thereby.

67 Claims, 2 Drawing Sheets

(Amended)

FIG. 1 (Amended)
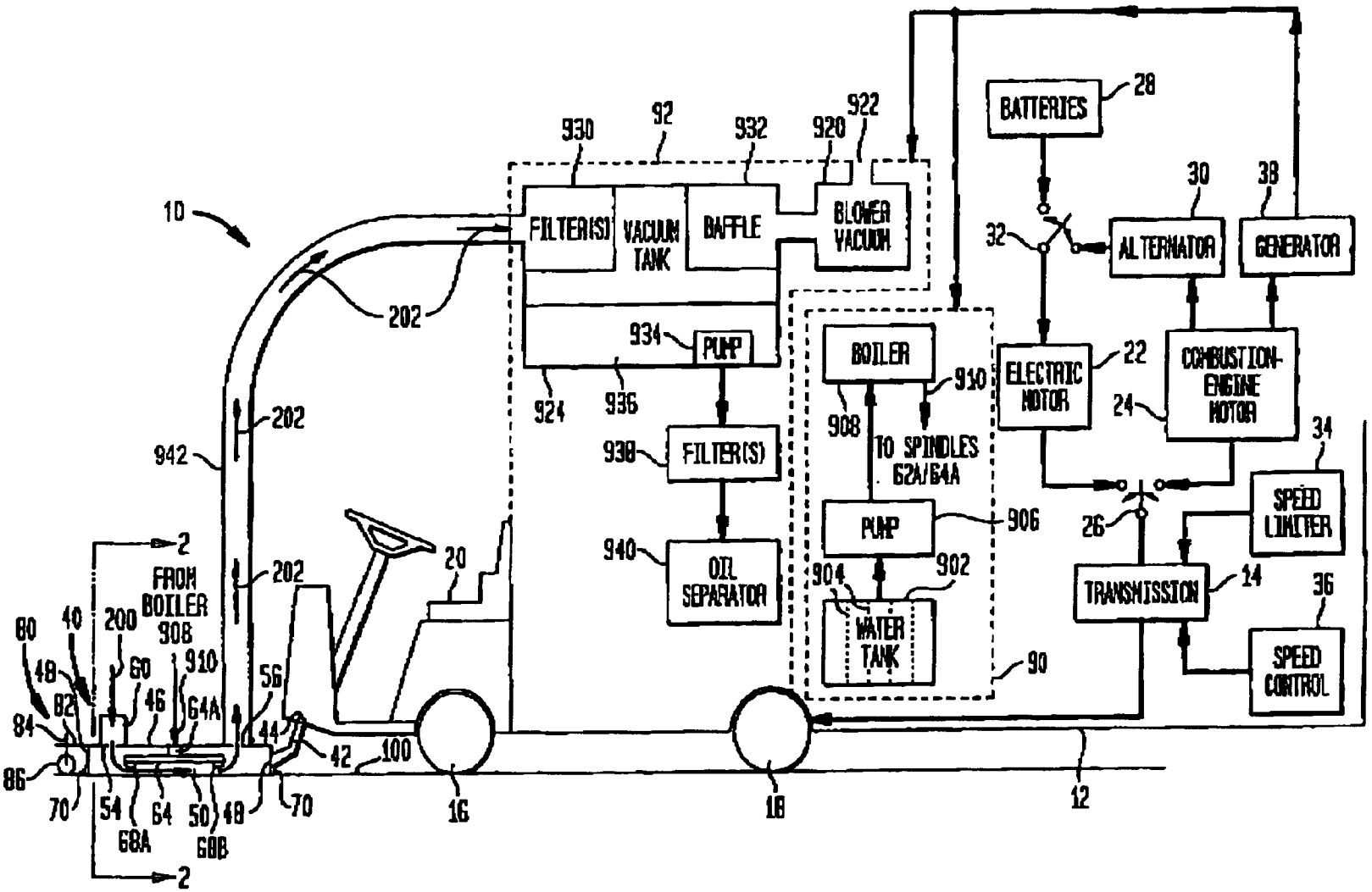

FIG. 3 (Amended)
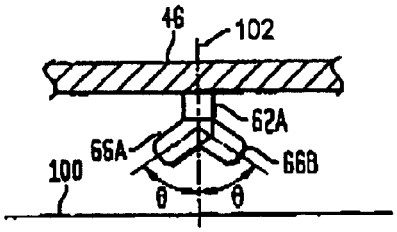

SELF-PROPELLED BRUSHLESS SURFACE CLEANER WITH RECLAMATION

Matter enclosed in heavy brackets [ ] appears in the original patent but forms no part of this reissue specification; matter printed in italics indicates the additions made by reissue.

FIELD OF THE INVENTION

The invention relates generally to surface cleaning apparatus, and more particularly to a self-contained and self-propelled brushless surface cleaner that effectively scrubs a surface with pressurized/heated fluid, and that reclaims both the fluid and contaminants loosened from a surface during the cleaning thereof.

BACKGROUND OF THE INVENTION

A variety of industrial-strength surface cleaners are known in the prior art. In general, a pressurized cleaning fluid is sprayed onto a surface to loosen dirt, rubber, oil, grease, etc., that has been deposited on the surface during the use thereof. The loosened dirt and other contaminants are then vacuumed. Some surface cleaners filter out the dirt and other contaminants in order to reuse the cleaning fluid. Specific examples of prior art cleaners are noted below.

U.S. Pat. No. 3,959,010 discloses a surface cleaner having a spray/vacuum head attached to the front of a tractor and having mechanical systems mounted on a towed trailer. The spray/vacuum head has spray nozzles mounted in separate fore and aft compartments thereof. A central compartment positioned between the fore and aft compartments defines a vacuum chamber. Holes are provided in a bottom wall of the vacuum chamber adjacent the surface to be cleaned. Air vortexes are created at the holes as the vacuum is drawn therethrough.

U.S. Pat. No. 4,845,801 discloses a surface cleaning vehicle having a forward-mounted low-pressure sprayer, an aft-mounted high-pressure sprayer head and vacuum head mounted aft of the high-pressure sprayer for vacuuming up liquid and loose debris.

U.S. Pat. No. 5,331,713 discloses a surface cleaning vehicle having a front-mounted sprayer followed immediately by rotating brush heads. A squeegee and vacuuming assembly is mounted at the aft portion of the vehicle to vacuum up cleaning liquid and debris.

U.S. Pat. Nos. 5,287,589, 5,469,597 and 5,979,012 disclose surface cleaners having vehicle-mounted mechanical systems coupled by long hoses to either walk-behind cleaning heads or individual spray and vacuum wands. The walk-behind cleaning heads or wands must be manually moved/manipulated while the vehicle is frequently moved to a suitable support distance.

Unfortunately, none of the prior art surface cleaners is able to achieve the combination of superior surface cleaning, elimination of cleaning fluid runoff, complete cleaning fluid reclamation, and efficient of operating manpower.

SUMMARY OF THE INVENTION

Accordingly, it is an object of the present invention to provide a surface cleaner having improved cleaning capabilities for cleaning hard flat industrial surfaces such as ship decks, airport runways, streets, parking surfaces and industrial floors.

Another object of the present invention is to provide a surface cleaner that is totally self-contained.

Yet another object of the present invention is to provide a surface cleaner that can be operated by a single person.

Still another object of the present invention is to provide a surface cleaner that effectively scrubs a surface without the use of brushes or other types of surface-contacting scrubbing devices.

A still further object of the present invention is to provide a self-propelled surface cleaner that is easy to maneuver on a surface to be cleaned.

Yet another object of the present invention is to provide a surface cleaner that reclaims its cleaning fluid while trapping loosened surface contaminants in order to prevent any toxic runoff.

Other objects and advantages of the present invention will become more obvious hereinafter in the specification and drawings.

In accordance with the present invention, a brushless surface cleaner includes a vehicle having at least one drive system for propelling the vehicle on a surface to be cleaned. A cleaning head is mounted to the vehicle to extend forward therefrom. The cleaning head has a deck and a skirt extending from the deck such that when the skirt is placed in contact with the surface to be cleaned, a cleaning volume is bounded by the deck, skirt and surface to be cleaned. The cleaning head further has at least one vent port formed in a forward portion thereof and at least one vacuum port formed in a rear portion thereof. A plurality of nozzles are mounted for movement within the cleaning volume between the forward and rear portions thereof when liquid under pressure is supplied thereto and sprayed therefrom. A liquid supply system is mounted on the vehicle for supplying the liquid under pressure to the nozzles so that the surface to be cleaned is effectively scrubbed by the liquid to produce a mixture of the liquid and contaminants loosened from the surface to be cleaned. A vacuum recycling system is mounted on the vehicle and coupled to the vacuum port(s) for suctioning the mixture, filtering the mixture to separate the liquid from the contaminants and return the liquid so-separated to the liquid supply system for reuse thereby.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a side schematic view of an embodiment of the self-propelled brushless surface cleaner according to the present invention;

FIG. 3 is an isolated side view taken along line 3—3 of DIG. 2—2 depicting the angular orientation of a pair of nozzles coupled to a rotating arm in the present invention;

DETAILED DESCRIPTION OF THE INVENTION

Figure 2:
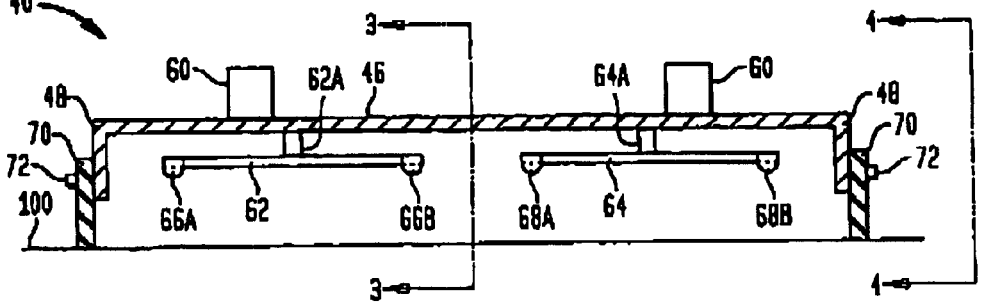
FIG. 2 is a front interior view of the surface cleaner's cleaning head taken along line 2—2 of FIG. 1.

Referring now to the drawings, and more particularly to FIG. 1, a self-propelled brushless surface cleaner according to the present invention is shown and referenced generally by numeral 10. Surface cleaner 10 is a self-contained assembly for cleaning a surface 100 over which it can be driven. Such surfaces include, but are not limited to, runways, streets, sidewalks, parking surfaces, decks of ships and industrial floor areas.

Surface cleaner 10 includes a self-propelled vehicle having a frame 12, a drive train coupled to frame 12 that includes a transmission 14 coupled to rear wheels 18 (as shown) and/or front wheels 16. Controls for driving surface cleaner 10 and operating various systems thereon are provided in a driver/operator compartment 20 at the front portion of the vehicle. For reasons that will be explained further below, transmission 14 can be selectively coupled to either an electric motor 22 or a combustion-engine motor 24 via an operator-positioned switch 26. For reasons that will be explained further below, the driving speed of surface cleaner 10 can be limited to a maximum speed by coupling a speed limiter or governor 34 to transmission 14. Another option is to dictate a constant driving speed of surface cleaner 10 by coupling a speed controller 36 to transmission 14.

Combustion-engine motor 24 can be any motor that runs on a combustible fuel such as gasoline, diesel fuel, propane gas, etc. Electric motor 22 can be powered by one or more batteries 28 or by a DC current-producing alternator 30. More specifically, alternator 30 is coupled mechanically to combustion-engine motor 24 and electrically to a switch 32 that is selectively positioned to couple either batteries 28 or alternator 30 to electric motor 22. In this way, even if batteries 28 run low during the cleaning operation, power for electric motor 22 can simply be switched over to alternator 30 which is turned by combustion-engine 24. An AC voltage generator 38 is also mechanically coupled to combustion-engine motor 24 to produce an AC voltage for use by various electrically-powered elements onboard surface cleaner 10 as will be explained further below.

A cleaning head 40 is mounted at the front of surface cleaner 10 by means of, for example, an arm 42 pivotally attached to frame 12 at pivot point 44. Arm 42 can be manually pivoted or pivoted via a motorized force to raise/lower cleaning head 40 and set a forward-to-rear pitch angle of cleaning head 40 relative to surface 100.

Cleaning head 40 is defined by an inverted tray shape having a top or deck 46 and a peripheral side skirt 48 that extends down from deck 46 when cleaning head 40 is positioned over surface 100 as shown. In use, when cleaning head 40 is placed in contact with surface 100, (i.e., a sealing band 70 contacts surface 100), a cleaning volume 50 is defined by the volume of air space bounded by deck 46 on its top, skirt 48 (to include band 70) on its sides and surface 100 at its bottom. At the forward portion of cleaning head 40, one or more vent ports 54 are provided. At the rear portion of cleaning head 40, one or more vacuum [portions] *ports* 56 are provided. By way of convention, the terms "forward" and "rear" as used herein are relative to normal forward motion of surface cleaner 10, i.e., front wheels 16 leading back wheels 18.

Ports 54 and 56 are preferably formed in deck 46 and allow outside air to communicate with cleaning volume 50. The area defined by ports 54 should be approximately equal to the area defined by port(s) 56. However, the shape or number of ports 54 or 56 is not a limitation of the present invention. An open-ended [prior] duct 60 can be attached to deck 46 to effectively extend the height at which each port 54 communicates with the outside air. The function of duct 60 will be explained below.

Referring additionally to FIG. 2 which depicts a front interior view of cleaning head 40 taken along line 2—2 in FIG. 1, a pair of side-by-side arms 62 and 64 are rotatably mounted to deck 46 by means of spindles 62A and 64A, respectively. Each combination of spindles and arm (e.g., spindle 62A and arm 62) is also a conduit for delivering a water supply to nozzles 66A/66B (mounted on arm 62) and nozzles 68A/68B (mounted on arm 64). Arms 62 and 64 are sized so that nozzles 66A/66B and 68A/68B experience movement within cleaning volume 50 between ports 54 and 56. Each of the nozzles is directed towards surface 100 at an acute angle with respect to a surface-extending vertical line such that when water is sprayed therefrom, arms 62 and 64 rotate parallel to deck 46 on their respective spindles. For example, as illustrated in FIG. 3, nozzles 66A and 66B are directed at opposite acute angles θ relative to an imaginary vertical line 102 that is perpendicular to surface 100. Acute angle θ is typically in the range of approximately 15–30°. Note that during testing of surface cleaner 10, it was found that an angle θ of approximately 30° provided the best cleaning results.

As mentioned above, attached to the lower periphery of skirt 48 is a band 70 of flexible material that forms a seal with surface 100. Band 70 is a strong but flexible material that can withstand abrasion forces developed as cleaning head 40 moves over surface 100. A material that performed well in testing of surface cleaner 10 is a multi-layered material having alternating layers of rubber and nylon. This material is available commercially from a variety of rubber manufacturers such as B.F. Goodrich and Goodyear.

Figure 4:
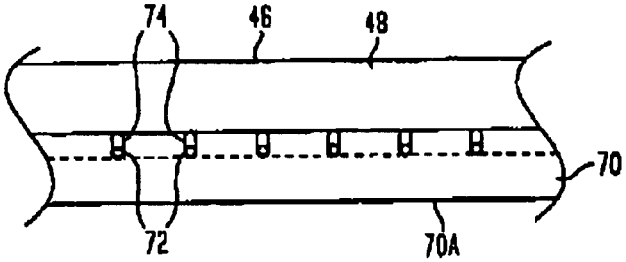
FIG. 4 is a side view of a portion of the cleaning head taken along line 4—4 of FIG. 3 depicting the attachment of the sealing band to the cleaning head's skirt.

Referring now to FIG. 4, band 70 is mounted to skirt 48 using a plurality of bolts/screws 72. Band 70 has elongated slots 74 formed therethrough to receive bolts/screws 72. The use of elongated slots 74 allows band 70 to be lowered as its bottom edge 70A becomes worn/damaged. This effectively increases the useful life of band 70.

Attached to the forward end of cleaning head 40 are a plurality of spaced-apart wheel assemblies, one of which is illustrated in FIG. 1 and referenced generally by numeral 80. The wheel assemblies support-cleaning head 40. Further, by making the height of each wheel assembly 80 independently adjustable, the side-to-side pitch of cleaning head 40 can be adjusted. In general, a wheel assembly 80 includes a fixed support 82 and an adjustable height support 84 coupled to a wheel 86. The particular configurations of support 82 and 84 are not limitations of the present invention.

Coupled to cleaning head 40 are a liquid (e.g., water) delivery system and a vacuum/recycling system, both of which are mounted on frame 12. Referring again to FIG. 1, the basic elements of the liquid delivery system are contained within dashed-line box 90 and the basic elements of the vacuum/recycling system are contained within dashed-line box 92. Electricity for various elements of systems 90 and 92 is provided by generator 38 which is turned whenever combustin-engine motor 24 is operating.

Liquid delivery system 90 includes a large water storage tank 902 which can be baffled at 904 to prevent/minimize sloshing forces when surface cleaner 10 is moving. A high-pressure pump 906 is coupled to tank 902 to draw water therefrom and pump same under high pressure to a boiler 908. Although not shown for clarity of illustration, pump 906 is typically a mechanically-driven pump that would be coupled to combustion-engine motor 24 as would be well understood in the art. For longevity of service, boiler 908 can be constructed entirely of stainless steel.

Water under pressure circulates through boiler 908 and exits same at a set elevated temperature. The heated and pressurized water is supplied at [901] *910* to nozzles 66A/66B and 68A/68B via spindle 62A/arm 62 and spindle 64A/arm 64, respectively, thereby causing each arm to rotate within cleaning volume 50 as water is sprayed onto surface 100.

Vacuum/recycling system 92 includes a blower-type vacuum 920 having its blowing vent side vented at 922 and its suction side coupled to a vacuum tank 924. Vacuum tank 924 is a sealed tank ported at 926 and 928. Ports 926 and 928 should define approximately equal areas. Port 926 has a larger-particle filter 930 coupled thereto and port 928 has a baffle 932 coupled thereto. Filter 930 and baffle 932 reside in the air space of vacuum tank 924, and will be explained further below. A pump 934 (e.g., a sump pump) is mounted in the lower (fluid-filled) portion of vacuum tank 924. Pump 934 pumps fluid 936 through one or more particle filters 938. If a plurality of filters 938 are used, they would typically be coupled in series in descending order of particle sizes to be filtered. The particle-strained fluid is then passed through an oil separator 940 (e.g., a coalesce filter as they are known in the art). The fluid exiting oil separator 940 is clean water that is returned to tank 902 for reuse in the cleaning process. Port 926 is coupled via hose 942 to vacuum port(s) 56.

Figure 5:
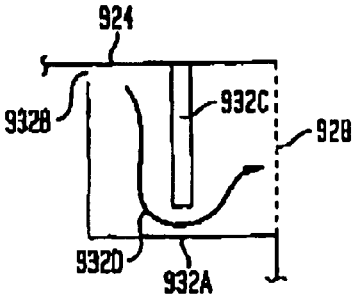
FIG. 5 is a top schematic view of an embodiment of the baffle mounted in the vacuum tank of the vacuum/recycling system.

The details of an embodiment of baffle 932 are illustrated in FIG. 5 where a box-like structure 932A is attached to vacuum tank 924. In the top view shown in FIG. 5, only the sides of box-like outer structure 932A are shown. However, it is to be understood that outer structure 932A includes a top and bottom. A narrow slot or port 932B is formed between outer structure 932A and tank 924. The area of port 932B matches that of port 928. A baffle plate 932C in outer structure 932A defines a tortuous path 932D through baffle 932 so that any of [liquid] *fluid* 936 drawn up towards port 928 (by the vacuum force drawn through port 928) is entrained by baffle 932.

Figure 6:
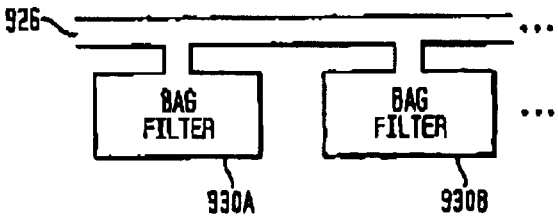
FIG. 6 is a schematic view of a plurality of bag filters mounted in the vacuum tank for filtering large particles from liquid passed therethrough.

An embodiment of large particle filter(s) 930 is illustrated in FIG. 6 where a plurality of bag filters 930A, 930B, etc., are coupled in parallel to port 926. Each of the bag filters traps larger particles (e.g., 100 microns or greater) while allowing the mixture of liquid and smaller particles to pass therethrough as liquid 936 that falls via gravity to the lower portion of vacuum tank 924.

In operation, surface cleaner 10 has tank 902 filled with water and is driven to a site to be cleaned. When driving to a site, switch 26 will normally be positioned to couple combustion-engine 24 to transmission 14. Once surface cleaner 10 is in position to begin cleaning, switch 26 is positioned so that electric motor 22 is coupled to transmission 14. Combustion-engine motor 24 continues running to turn alternator 30 and generator 38, as well as provide the mechanical drive for elements such as pump 906. Cleaning head 40 is lowered onto surface 100 with its front-to-rear and side-to-side pitch being set to accommodate surface 100. Systems 90 and 92 are turned on and surface cleaner lo is driven over surface 100.

Heated water under pressure is sprayed from nozzles 66A/66B and 68A/68B causing arms 62 and 64, respectively, to rotate between ports 54 and 56 as described above. The hot, pressurized water loosens solid debris and other contaminants from surface 100. A vacuum force created by vacuum/recycling system 92 is applied through hose 942 to port(s) 56. The suction force from this vacuum draws outside air into cleaning volume 50 via duct(s) 60. The use of ducts 60 prevent water sprayed into cleaning volume 50 from escaping therefrom via port(s). The resulting air flow into and through cleaning volume 50 is illustrated at 200. By placing port(s) 54 and 56 at the respective forward and rear portions of cleaning volume 50, a high-pressure air flow is drawn over surface 100 in the area where high-pressure water is being sprayed. This large area of high-pressure air flow serves to not only pick up the water and loosened debris/contaminants, but also frees debris/contaminants partially loosened by the high-pressure water spray. Placing ports 54 and 56 in the top of cleaning volume 50 (i.e., in deck 46) has the further advantage of allowing the downward rush of air passing through duct(s) 60 and port(s) 54 to strike surface 100 to aid in loosening contaminants from surface 100. The resulting mixture 202 of water and loosened debris/contaminants is drawn into hose 942 and delivered to vacuum tank 924. During testing of surface cleaner 10, the best cleaning results were obtained when water at a temperature of approximately 150° F. was delivered from nozzles 66A/66B and 68A/68B at a flow rate of approximately 13 gallons per minute (gpm) and a pressure of approximately 4000 pounds per square inch (psi), while maintaining a vacuum of approximately 400 cubic feet per minute (cfm).

Mixture 202 is first filtered by large particle filter(s) 930 where larger solid particles are trapped and a partially filtered liquid is deposited via gravity as liquid 936 in the lower portion of tank 924. Pump 934, filter(s) 938 and oil separator 940 function as described above to return clean water to tank 902.

During the cleaning process, surface cleaner 10 is driven under the power of electric motor 22 because of its smoother delivery of power to transmission 14 as compared to combustion-engine motor 24. For optimum cleaning, cleaning head 40 should move at a relatively constant speed over surface 100. This constraint is simplified for an operator by powering transmission 14 via electric motor 22. For greater precision, a consistent speed could be maintained automatically by use of speed control 36. Furthermore, optimum cleaning is obtained by assuring that cleaning head 40 is positioned over each area of surface 100 for a certain period of time. This is achieved by not driving surface cleaner 10 to quickly over surface 100. Once again, while this quality control measure can be left up to the operator, speed limiter 34 can be coupled to transmission 14 during the cleaning operation to assure that the maximum (optimum cleaning) speed for a particular surface is not exceeded. For safety reasons, the use of speed limiter 34 may be preferred to speed control 36.

The advantages of the present invention are numerous. Improved surface cleaning is achieved by a uniquely-designed cleaning head that uses both high-pressure water and a uniquely directed vacuum flow to remove the maximum amount of debris/contaminants from a surface using only hot water. The surface cleaner is self-contained and self-propelled so that it can be efficiently operated by one person. The contaminated cleaning water is reclaimed for reuse. Further, since the spray/vacuum operation is contained within a single cleaning head, there is no toxic runoff generated by the cleaning operation. The surface cleaner can be propelled smoothly by an electric motor for optimum cleaning while simultaneously using a combustion-engine motor to charge batteries and drive various mechanical systems.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A brushless surface cleaner, comprising:

a vehicle having at least one drive system for propelling said vehicle on a surface to be cleaned;

a cleaning head mounted to said vehicle to extend forward therefrom, said cleaning head having a deck and a skirt extending from said deck wherein, when said skirt is placed in contact with the surface to be cleaned, a cleaning volume is bounded by said deck, said skirt and the surface to be cleaned;

said cleaning head having at least one vent port formed in a forward portion thereof and at least one vacuum port formed in a rear portion thereof;

a plurality of nozzles mounted to said deck for movement between said forward portion and said rear portion within said cleaning volume when liquid under pressure is supplied thereto and sprayed therefrom;

a liquid supply system mounted on said vehicle for supplying said liquid under pressure to said plurality of nozzles wherein the surface to be cleaned is effectively scrubbed by said liquid to produce a mixture of said liquid and contaminants loosened from the surface to be cleaned; and a vacuum recycling system mounted on said vehicle and coupled to said at least one vacuum port for suctioning said mixture, filtering said mixture to separate said liquid from said contaminants and returning said liquid so-separated to said liquid supply system for reuse thereby.

2. [A] *The* brushless surface cleaner as in claim 1 wherein said at least one vent port and said at least one vacuum port are formed in said deck.

3. [A] *The* brushless surface cleaner as in claim 1 wherein the area defined by said at least one vent port is approximately equal to the area defined by said at least one vacuum port.

4. [A] *The* brushless surface cleaner as in claim 1 further comprising an open-ended duct extending from each said vent port and away from said cleaning volume.

5. [A] *The* brushless surface cleaner as in claim 1 wherein said skirt includes a flexible seal for contacting the surface to be cleaned.

6. [A] *The* brushless surface cleaner as in claim 5 wherein said flexible seal comprises a multi-layered material having at least one layer of rubber and at least one layer of nylon.

7. [A] *The* brushless surface cleaner as in claim 5 wherein said flexible seal is mounted for adjustable positioning relative to said deck.

8. [A] *The* brushless surface cleaner as in claim 1 further comprising means for adjusting a forward-to-rear pitch of said cleaning head relative to the surface to be cleaned.

9. [A] *The* brushless surface cleaner as in claim 1 further comprising means for adjusting a side-to-side pitch of said cleaning head relative to the surface to be cleaned.

10. [A] *The* brushless surface cleaner as in claim 1 wherein said at least one drive system comprises:

an electric motor;

a combustion-engine motor;

a drive train; and means for selectively coupling one of said electric motor and said combustion-engine motor to said drive train to propel said vehicle.

11. [A] *The* brushless surface cleaner as in claim 10 further comprising:

at least one battery serving as a first source of electricity;

an alternator coupled to said combustion-engine motor wherein operation of said combustion-engine motor causes said alternator to serve as a second source of electricity; and means for coupling one of said first source and said second source to said electric motor.

12. [A] *The* brushless surface cleaner as in claim 1 further comprising a speed limiter coupled to said at least one drive system for setting the top speed of said vehicle.

13. [A] *The* brushless surface cleaner as in claim 1 further comprising a speed control coupled to said at least one drive system for maintaining a selected constant speed of said vehicle.

14. [A] *The* brushless surface cleaner as in claim 1 wherein each of said plurality of nozzles is directed towards the surface to be cleaned at an acute angle of approximately 30° with respect to vertical.

15. [A] *The* brushless surface cleaner as in claim 1 wherein said liquid supply system comprises:

a tank for storing said liquid;

a pump coupled to said tank for pumping said liquid therefrom under pressure; and a boiler having an inlet coupled to said pump for receiving said liquid under pressure and said boiler having an outlet coupled to said plurality of nozzles.

16. [A] *The* brushless surface cleaner as in claim 1 wherein said vacuum recycling system comprises:

a vacuum tank coupled to said at least one vacuum port;

first filter means mounted in said vacuum tank for partially filtering said mixture wherein a partially-filtered mixture is deposited via gravity in a lower portion of said vacuum tank;

a sump pump mounted in said lower portion of said vacuum tank for pumping said partially-filtered mixture therefrom;

second filter means coupled to said sump pump for completely filtering said partially-filtered mixture wherein said liquid is returned to said liquid supply system; and a vacuum source coupled to an upper portion of said vacuum tank above said partially-filtered mixture for suctioning air from said upper portion of said vacuum tank to maintain a suction force at said at least one vacuum port.

17. [A] *The* brushless surface cleaner as in claim 16 further comprising a baffle mounted in said upper portion of said vacuum tank for entrainment of said partially-filtered mixture drawn into said air in said upper portion of said vacuum tank by said vacuum source.

18. [A] *The* brushless surface cleaner as in claim 1 further comprising a pair of side-by-side mounting arms rotatably mounted to said deck between said forward portion and said rear portion for rotation within said cleaning volume in a plane substantially parallel to said deck, each of said mounting arms having at least one of said plurality of nozzles mounted thereon wherein said mounting arms rotate when said liquid under pressure is sprayed from said plurality of nozzles.

19. A brushless surface cleaner, comprising:

a vehicle having at least one drive system for propelling said vehicle on a surface to be cleaned;

a cleaning head mounted to said vehicle to extend forward therefrom, said cleaning head having a deck and a skirt extending from said deck wherein, when said skirt is placed in contact with the surface to be cleaned, a cleaning volume is bounded by said deck, said skirt and the surface to be cleaned;

said cleaning head having at least one vent port formed in a forward portion of said deck and at least one vacuum port formed in a rear portion of said deck, wherein the area defined by said at least one vent port is approximately equal to the area defined by said at least one vacuum port;

a plurality of nozzles mounted to said deck for movement within said cleaning volume when liquid under pressure is supplied thereto and sprayed therefrom, said movement being between said at least one vent port and said at least one vacuum port, each of said plurality of nozzles directed towards the surface to be cleaned at an acute angle with respect to vertical;

a liquid supply system mounted on said vehicle for supplying said liquid under pressure to said plurality of nozzles wherein the surface to be cleaned is effectively scrubbed by said liquid to produce a mixture of said liquid and contaminants loosened from the surface to be cleaned; and a vacuum recycling system mounted on said vehicle and coupled to said at least one vacuum port for suctioning said mixture, filtering said mixture to separate said liquid from said contaminants and returning said liquid so-separated to said liquid supply system for reuse thereby.

20. [A] *The* brushless surface cleaner as in claim 19 further comprising an open-ended duct extending from each said vent port and away from said cleaning volume.

21. [A] *The* brushless surface cleaner as in claim 19 wherein said skirt includes a flexible seal for contacting the surface to be cleaned.

22. [A] *The* brushless surface cleaner as in claim 21 wherein said flexible seal comprises a multi-layered material having at least one layer of rubber and at least one layer of nylon.

23. [A] *The* brushless surface cleaner as in claim 21 wherein said flexible seal is mounted for adjustable positioning relative to said deck.

24. [A] *The* brushless surface cleaner as in claim 19 further comprising means for adjusting a forward-to-rear pitch of said cleaning head relative to the surface to be cleaned.

25. [A] *The* brushless surface cleaner as in claim 19 further comprising means for adjusting a side-to-side pitch of said cleaning head relative to the surface to be cleaned.

26. [A] *The* brushless surface cleaner as in claim 19 wherein said at least one drive system comprises:

an electric motor;

a combustion-engine motor;

a drive train; and means for selectively coupling one of said electric motor and said combustion-engine motor to said drive train to propel said vehicle.

27. [A] *The* brushless surface cleaner as in claim 26 further comprising:

at least one battery serving as a first source of electricity;

an alternator coupled to said combustion-engine motor wherein operation of said combustion-engine motor causes said alternator to serve as a second source of electricity; and means for coupling one of said first source and said second source to said electric motor.

28. [A] *The* brushless surface cleaner as in claim 19 further comprising a speed limiter coupled to said at least one drive system for setting the top speed of said vehicle.

29. [A] *The* brushless surface cleaner as in claim 19 further comprising a speed control coupled to said at least one drive system for maintaining a selected constant speed of said vehicle.

30. [A] *The* brushless surface cleaner as in claim 19 wherein said acute angle is approximately 30°.

31. [A] *The* brushless surface cleaner as in claim 19 wherein said liquid supply system comprises:

a tank for storing said liquid;

a pump coupled to said tank for pumping said liquid therefrom under pressure; and a boiler having an inlet coupled to said pump for receiving said liquid under pressure and said boiler having an outlet coupled to said plurality of nozzles.

32. [A] *The* brushless surface cleaner as in claim 19 wherein said vacuum recycling system comprises:

a vacuum tank coupled to said at least one vacuum port;

first filter means mounted in said vacuum tank for partially filtering said mixture wherein a partially-filtered mixture is deposited via gravity in a lower portion of said vacuum tank;

a sump pump mounted in said lower portion of said vacuum tank for pumping said partially-filtered mixture therefrom;

second filter means coupled to said sump pump for completely filtering said partially-filtered mixture wherein said liquid is returned to said liquid supply system; and a vacuum source coupled to an upper portion of said vacuum tank above said partially-filtered mixture for suctioning air from said upper portion of said vacuum tank to maintain a suction force at said at least one vacuum port.

33. [A] *The* brushless surface cleaner as in claim 32 further comprising a baffle mounted in said upper portion of said vacuum tank for entrainment of said partially-filtered mixture drawn into said air in said upper portion of said vacuum tank by said vacuum source.

34. [A] *The* brushless surface cleaner as in claim 19 further comprising a pair of side-by-side mounting arms rotatably mounted to said deck between said forward portion and said rear portion for rotation within said cleaning volume in a plane substantially parallel to said deck, each of said mounting arms having at least one of said plurality of nozzles mounted thereon wherein said mounting arms rotate when said liquid under pressure is sprayed from said plurality of nozzles.

35. A brushless surface cleaner, comprising:

a vehicle having an electric motor, a combustion-engine motor, a drive train, and means for selectively coupling one of said electric motor and said combustion-engine motor to said drive train to propel said vehicle;

a cleaning head mounted to said vehicle to extend forward therefrom, said cleaning head having a deck and a skirt extending from said deck wherein, when said skirt is placed in contact with the surface to be cleaned, a cleaning volume is bounded by said deck, said skirt and the surface to be cleaned;

said cleaning head having at least one vent port formed in a forward portion of said deck and at least one vacuum port formed in a rear portion of said deck, wherein the area defined by said at least one vent port is approximately equal to the area defined by said at least one vacuum port;

an open-ended duct extending from each said vent port and away from said cleaning volume;

a plurality of nozzles mounted to said deck for movement within said cleaning volume when liquid under pressure is supplied thereto and sprayed therefrom, said movement being between said at least one vent port and said at least one vacuum port, each of said plurality of nozzles directed towards the surface to be cleaned at an acute angle with respect to vertical;

a liquid supply system mounted on said vehicle for supplying said liquid under pressure to said plurality of nozzles wherein the surface to be cleaned is effectively scrubbed by said liquid to produce a mixture of said liquid and contaminants loosened from the surface to be cleaned; and a vacuum recycling system mounted on said vehicle and coupled to said at least one vacuum port for suctioning said mixture, filtering said mixture to separate said liquid from said contaminants and returning said liquid so-separated to said liquid supply system for reuse thereby.

36. [A] *The* brushless surface cleaner as in claim 35 wherein said skirt includes a flexible seal for contacting the surface to be cleaned.

37. [A] *The* brushless surface cleaner as in claim 36 wherein said flexible seal comprises a multi-layered material having at least one layer of rubber and at least one layer of nylon.

38. [A] *The* brushless surface cleaner as in claim 36 wherein said flexible seal is mounted for adjustable positioning relative to said deck.

39. [A] *The* brushless surface cleaner as in claim 35 further comprising means for adjusting a forward-to-rear pitch of said cleaning head relative to the surface to be cleaned.

40. [A] *The* brushless surface cleaner as in claim 35 further comprising means for adjusting a side-to-side pitch of said cleaning head relative to the surface to be cleaned.

41. [A] *The* brushless surface cleaner as in claim 35 further comprising a speed limiter for setting the top speed of said vehicle.

42. [A] *The* brushless surface cleaner as in claim 35 further comprising a speed control for maintaining a selected constant speed of said vehicle.

43. [A] *The* brushless surface cleaner as in claim 35 wherein said acute angle is approximately 30°.

44. [A] *The* brushless surface cleaner as in claim 35 wherein said liquid supply system comprises:

a tank for storing said liquid;

a pump coupled to said tank for pumping said liquid therefrom under pressure; and a boiler having an inlet coupled to said pump for receiving said liquid under pressure and said boiler having an outlet coupled to said plurality of nozzles.

45. [A] *The* brushless surface cleaner as in claim 35 wherein said vacuum recycling system comprises:

a vacuum tank coupled to said at least one vacuum port;

first filter means mounted in said vacuum tank for partially filtering said mixture wherein a partially-filtered mixture is deposited via gravity in a lower portion of said vacuum tank;

a sump pump mounted in said lower portion of said vacuum tank for pumping said partially-filtered mixture therefrom;

second filter means coupled to said sump pump for completely filtering said partially-filtered mixture wherein said liquid is returned to said liquid supply system; and a vacuum source coupled to an upper portion of said vacuum tank above said partially-filtered mixture for suctioning air from said upper portion of said vacuum tank to maintain a suction force at said at least one vacuum port.

46. [A] *The* brushless surface cleaner as in claim 45 further comprising a baffle mounted in said upper portion of said vacuum tank for entrainment of said partially-filtered mixture drawn into said air in said upper portion of said vacuum tank by said vacuum source.

47. [A] *The* brushless surface cleaner as in claim 35 further comprising:

at least one battery serving as a first source of electricity;

an alternator coupled to said combustion-engine motor wherein operation of said combustion-engine motor causes said alternator to serve as a second source of electricity; and means for coupling one of said first source and said second source to said electric motor.

48. [A] *The* brushless surface cleaner as in claim 35 further comprising a pair of side-by-side mounting arms rotatably mounted to said deck between said forward portion and said rear portion for rotation within said cleaning volume in a plane substantially parallel to said deck, each of said mounting arms having at least one of said plurality of nozzles mounted thereon wherein said mounting arms rotate when said liquid under pressure is sprayed from said plurality of nozzles.

*49. A surface cleaner, comprising:*

*at least one drive system for propelling said surface cleaner on a surface to be cleaned;*

*a cleaning head having a deck and a skirt extending from said deck wherein, when said skirt is placed in contact with a surface to be cleaned, a cleaning volume is bounded by said deck, said skirt and the surface to be cleaned;*

*said cleaning head having at least one vent port and at least one vacuum port;*

*at least one nozzle mounted to said deck within said cleaning volume, and liquid under pressure is supplied to said at least one nozzle and sprayed therefrom;*

*a liquid supply system for supplying said liquid under pressure to said at least one nozzle wherein said surface to be cleaned is effectively scrubbed by said liquid to produce a mixture of said liquid and contaminants loosened from said surface to be cleaned;*

*a vacuum recycling system mounted on said vehicle and coupled to said at least one vacuum port for suctioning said mixture from said surface to be cleaned into said vacuum system, filtering said mixture to separate said liquid from said contaminants, and returning said liquid so-separated to said liquid supply system for reuse thereby; and*

*at least one drive system for propelling said surface cleaner on said surface to be cleaned.*

*50. The surface cleaner as in claim 49 wherein said at least one vent port and said at least one vacuum port are formed in said deck.*

*51. The surface cleaner as in claim 49 wherein the area defined by said at least one vent port is approximately equal to the area defined by said at least one vacuum port.*

*52. The surface cleaner as in claim 49 further comprising an open-ended duct extending from each said vent port and away from said cleaning volume.*

*53. The surface cleaner as in claim 49 wherein said skirt includes a flexible seal for contacting the surface to be cleaned.*

*54. The surface cleaner as in claim 53 wherein said flexible seal comprises a multi-layered material having at least one layer of rubber and at least one layer of nylon.*

*55. The surface cleaner as in claim 53 wherein said flexible seal is mounted for adjustable positioning relative to said deck.*

*56. The surface cleaner as in claim 49 further comprising means for adjusting a forward-to-rear pitch of said cleaning head relative to the surface to be cleaned.*

*57. The surface cleaner as in claim 49 further comprising means for adjusting a side-to-side pitch of said cleaning head relative to the surface to be cleaned.*

*58. The surface cleaner as in claim 49 wherein said at least one drive system comprises:*

*an electric motor;*

*a combustion-engine motor;*

*a drive train; and*

*means for selectively coupling one of said electric motor and said combustion-engine motor to said drive train to propel said surface cleaner.*

*59. The surface cleaner as in claim 58 further comprising:*

*at least one battery serving as a first source of electricity;*

*an alternator coupled to said combustion-engine motor wherein operation of said combustion-engine motor causes said alternator to serve as a second source of electricity; and*

*means for coupling one of said first source and said second source to said electric motor.*

*60. The surface cleaner as in claim 49 further comprising a speed limiter coupled to said at least one drive system for setting the top speed of said surface cleaner.*

*61. The surface cleaner as in claim 49 further comprising a speed control coupled to said at least one drive system for maintaining a selected constant speed of said surface cleaner.*

*62. The surface cleaner as in claim 49 wherein each of said at least one nozzle is directed towards the surface to be cleaned at an acute angle of approximately 30° with respect to vertical.*

*63. The surface cleaner as in claim 49 wherein said liquid supply system comprises:*

*a tank for storing said liquid;*

*a pump coupled to said tank for pumping said liquid therefrom under pressure; and*

*a boiler having an inlet coupled to said pump for receiving said liquid under pressure and said boiler having an outlet coupled to said at least one nozzle.*

*64. The surface cleaner as in claim 49 wherein said vacuum recycling system further comprises:*

*a vacuum tank for collecting the separated liquid before returning the liquid to said liquid supply system.*

*65. The surface cleaner as in claim 49 further comprising at least one mounting arm rotatably mounted to said deck for rotation within said cleaning volume in a plane substantially parallel to said deck, said at least one mounting arm having said at least one nozzle mounted thereon wherein said mounting arm rotates when said liquid under pressure is sprayed from said at least one nozzle.*

*66. The surface cleaner as in claim 64 further comprising:*

*first filter means mounted in said vacuum tank for partially filtering said mixture wherein a partially-filtered mixture is deposited via gravity in a lower portion of said vacuum tank;*

*a sump pump mounted in said lower portion of said vacuum tank for pumping said partially-filtered mixture therefrom;*

*second filter means coupled to said sump pump for completely filtering said partially-filtered mixture wherein said liquid is returned to said liquid supply system; and*

*a vacuum source coupled to an upper portion of said vacuum tank above said partially-filtered mixture for suctioning air from said upper portion of said vacuum tank to maintain a suction force at said at least one vacuum port.*

*67. The surface cleaner as in claim 66 further comprising a baffle mounted in said upper portion of said vacuum tank for entrainment of said partially-filtered mixture drawn into said air in said upper portion of said vacuum tank by said vacuum source.*

* * * * *